June 22, 1954  C. A. DOPP ET AL  2,681,787
SEATING MECHANISM FOR ROTATABLE PLUG VALVES
Filed Feb. 14, 1950  2 Sheets-Sheet 1

Inventors.
Carl A. Dopp,
Edward G. Schmidt &
Edmond P. DeCraene.
By Joseph O. Lange
Atty.

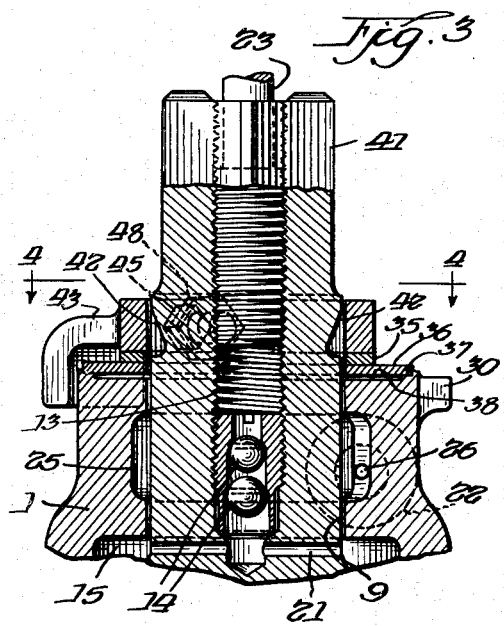

Patented June 22, 1954

2,681,787

UNITED STATES PATENT OFFICE 2,681,787

SEATING MECHANISM FOR ROTATABLE PLUG VALVES

Carl A. Dopp, Park Ridge, Edward G. Schmidt, La Grange, and Edmond P. De Craene, Westchester, Ill., assignors to Crane Co., Chicago, Ill., a corporation Application February 14, 1950, Serial No. 144,102

4 Claims. (Cl. 251—188)

1

This invention relates to fluid control valves, and, more particularly, to a seating mechanism for rotatable plug valves. This invention is an improvement in plug valves over that of U. S. patent application, Serial No. 69,330, filed January 5, 1949, now abandoned, in which the applicant is one of the co-inventors in this application.

An object of this invention is to provide a plug valve with a combination stop collar and plug adjustment for achieving a tight seating valve.

Another object is the provision of a valve which is compact in construction and economical in manufacture.

Other objects and advantages of the invention will become more apparent upon proceeding with the description read in light of the accompanying drawings, in which Fig. 1 is a fragmentary sectional view of a preferred embodiment of our invention.

Fig. 3 is a fragmentary sectional view showing a variation of the invention shown in Fig. 1.

Fig. 4 is a transverse section taken on the line 4—4 of Fig. 3.

Fig. 5 is a fragmentary sectional view through the valve showing a further modification of our invention.

Fig. 6 is a transverse section taken on a broken line 6—6 of Fig. 5.

Similar reference numerals refer to similar parts throughout the several views.

Figure 1:
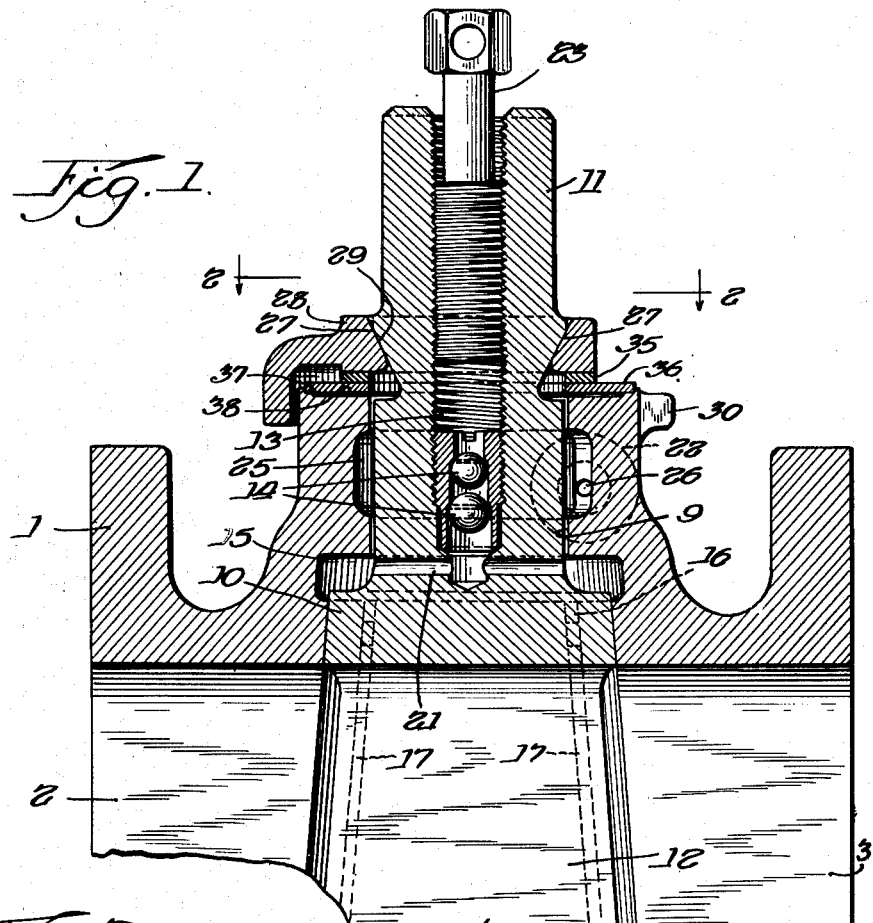
Figure 2:
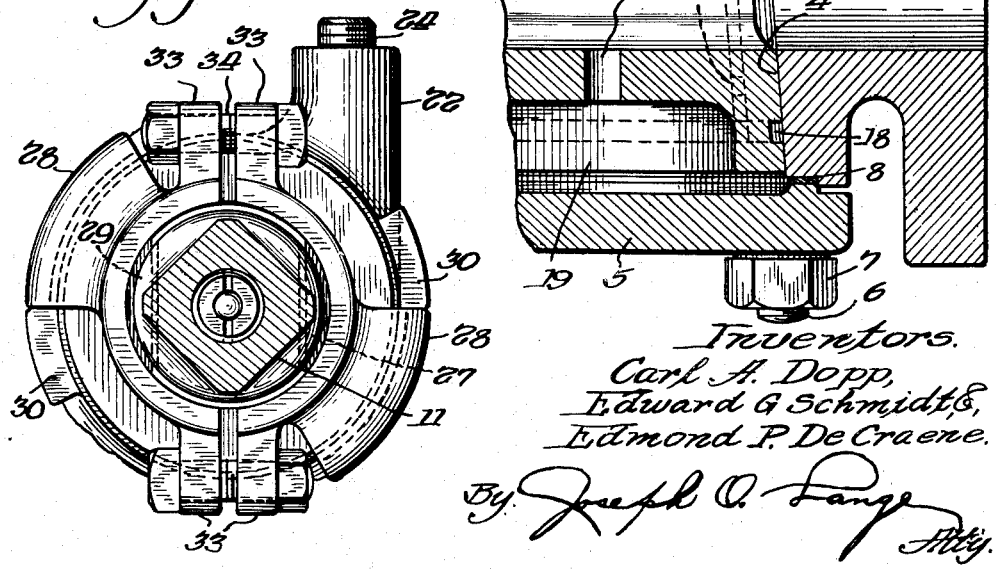
Fig. 2 is a transverse section taken on the line 2—2 of Fig. 1.

In the form of the valve shown in Figs. 1 and 2, the valve comprises the body 1 with openings 2 and 3 which allow fluid to flow through in either direction, as said fluid passes through conduits not shown on drawings, but said conduits are attachable to body 1 in a conventional manner. A tapered valve seat 4 is interposed between openings 2 and 3, and extends through the bottom of the valve body 1. A cover 5 and gasket 8, secured by a plurality of studs 6 and stud nuts 7, seal the bottom of the valve body 1. A circular opening 9 extends from valve seat 4 through the top of the valve body 1. A tapered closure plug 10 is mounted in the seat 4 and extends beyond the limits of the seat 4, thereby allowing rotation of the plug 10 within the seat 4 and a fluid tight closure between the openings 2 and 3. From the narrow end of the plug 10, a plug shank 11 extends through the opening 9. The end portion of the plug shank 11 is formed to receive a turning handle (not shown)

2 applied in rotating the plug 10 within the seat 4. Through the plug 10, a plug port 12 is located to communicate with openings 2 and 3 when the plug 10 is turned to the open position (as shown in Fig. 1).

Extending longitudinally into plug shank 11, is a threaded plug lubricant chamber 13. A lubricant reservoir 15, encircling the narrow end of plug 10 and disposed within body 1, is in communication with the lower end of the chamber 13 through a lubricant passageway 21 which extends transversely through plug shank 11. Within the lower end of the chamber 13, a check valve 14 operates in an inwardly direction allowing lubricant to flow through, but preventing the flow of lubricant in a return direction from passageway 21 into upper lubricant chamber 13. There may be a plurality of such check valves, as illustrated, to insure no return flow of the lubricant. On top of the valve seat 4, and in communication with the reservoir 15, lubricant grooves 16 are disposed at 90° extending a relatively short distance down the seat face 4. Lubricant grooves 17, extending longitudinally and disposed at 90° on the face of plug 10, communicate with and slightly overlap grooves 16. The lower end of groove 17 overlaps with the grooves 16 in the bottom of the valve seat 4. An annular groove 18 communicates with the grooves 16 in this bottom portion of the valve seat 4. Communication between grooves 16 and grooves 17 exists only when the plug 10 is in full open or closed position.

Lubricant chamber 13, being internally threaded, receives externally threaded lubricant screw 23. Through suitable operation of screw 23, a pressure may be placed on the lubricant in chamber 13, causing the lubricant to flow to the valve seat 4, and, if necessary, causing the lubricant to force the tapered plug 10 out of valve seat 4 by virtue of the pressure built up in chamber 15.

The bottom face of plug 10 contains a recess 19 and a passageway 20 which open the plug port 12 to the bottom cover 5. This allows for equalization of fluid pressures in the conduit line and around the bottom of the plug 10.

Fig. 2 shows the packing screw boss 22, and contained therein is the packing screw 24. The screw 24 operates through a packing chamber opening 26 (Fig. 1) to supply the plastic packing material dispersed within the annular extending packing chamber 25. The chamber 25 is located a relatively short distance above the plug 10, and encircles the plug shank 11.

The foregoing description applies to a conventional preferred construction. The novelty of this plug valve lies in the operation of the tapered stop collar 28 on the straight tapered plug shank areas 27 which are oppositely disposed along plug shank 11. The plug shank taper 27 is interposed for a relatively short distance between the turning handle end of the plug shank 11 and the packing chamber 25. This taper is preferably of a slight angle, in a direction opposite to the taper of the frustoconical plug 10.

Surrounding the plug shank 11 at the shank taper 27, is a stop and adjustment collar 28 divided into two substantially symmetrical halves which are adjustably drawn together by diametrically oppositely disposed bolts 34 acting on the collar flanges 33, as shown in Fig. 2. This causes a downward movement of collar 28 with tapers 29 bearing upward against the plug shank tapers 27, thereby providing for tight seating of plug 10 within seat 4. The tapered surfaces 27 and 29 may optionally be lubricated. A downwardly extending portion of collar 28 abuts against a stop collar lug 30 when the plug shank 11 is rotated in position, since stop collar tapers 29 are adjacent to and cooperating with the plug tapers 27.

In the operation of this invention, a tightening of bolts 34 draws the collar halves 28 together, causing collar 28 to slide on the tapered area 27 and to move downwardly, thereby applying a transverse force on a bearing washer 35 which is positioned immediately below the collar 28. Washer 35 bears against a resilient plate-like spring washer 36 which is located adjacent to and immediately below the washer 35, and is of substantially the same inner diameter but of a larger outer diameter than washer 35. A body shoulder 37 of annular form whose inner diameter is larger than the outer diameter of the bearing washer 35, provides upward support for the spring washer 36. Below washer 36, the body 1 is provided with a recess 38, the outer limits of said recess being defined by said shoulder 37. The depth of the recess 38 is an amount sufficient to allow a slight downward deflection of spring washer 36.

The action of the resilient spring washer 36 provides for adjustments in pressure differentials in the lubricant and line fluid which tend to unseat the plug 10. The spring action allows momentary unseating, but then tightly reseats the plug 10, as controlled by the resilience of the washer 36.

Obviously, plug shank 11 may extend off the larger end of plug 10, and with suitable arrangement of plug shank taper 27 along with collar 28, the force on plug 10 may be pushing rather than drawing. A suitable arrangement could be a plug shank taper in the direction as that of plug 10, and a cooperating collar with valve body support on the side furthermost from plug 10.

It will be appreciated that the foregoing description applies only to a preferred construction, but the invention is equally applicable to other forms, as, for example, those hereinafter described.

Figs. 3 and 4 show another form of this invention which applies the inclined plane. The plug shank 41 has curved tapered sides 42 diametrically oppositely disposed and extending a relatively short distance around plug shank 41 (as shown in Fig. 4). A substantially ring-shaped stop and adjustment collar 43 encircles the tapers 42. Diametrically oppositely disposed and thread engaged within collar 43, are plug adjustment screws 45 with locknuts 48 located in a plane which intersects with the tapers 42. This provides for the advancement of the screws 45 inwardly toward plug shank 41 causing the ends thereof to bear against the tapers 42. The latter movement of the screws 45 results in the downward movement of the collar 43 and with the same effect upon the plug, as described in connection with Fig. 1.

In all other respects, the mode of operation is the same as that previously described.

Referring now to a further modified form of the invention, in Figs. 5 and 6, plug shank 55 has an externally threaded section 53 which mates with an internally threaded plug shank shoulder 54 having a taper 56 extending completely around on the shoulder 54. A stop and adjustment collar 57, with taper 58 and of annular shape formed by two opposite halves, encircles plug shank 55 so that the tapers 56 and 58 adjoin and cooperate. By the tightening of diametrically oppositely disposed bolts 63, collar halves of collar 57 are drawn together through flanges 62. The result is collar 57 makes an axial movement downward, as described in Figs. 1 to 4, inclusive, and shank 55 move upward, thus giving a tight seating of the inverted taper plug (not shown).

Although washer 36 is used, it may be dispensed with and the upper portion of the body 1 may be used as resilient means.

Rotation of plug shank 55 rotates collar 57 by a frictional force between tapers 56 and 58 which is greater than any other frictional force acting on the collar 57. A projection of collar 57 meets stop lug 30 upon sufficient rotation of plug shank 55 in the same manner as described in the other figures.

While this invention has been shown in several forms, it is obvious to those skilled in the art that it is not so limited, but is susceptible of various changes and modifications without departing from the spirit thereof or the appended claims.

We claim:

1. A valve, comprising in combination a casing having a tapered annular seat with transverse openings at the ends thereof, a tapered closure plug engaging the seat of the casing and having a port to communicate with said casing openings, a plug shank extending from said plug's narrow end through said casing and having means for rotation of said plug, the said shank being tapered along a portion thereof, the taper extending at an angle opposed to that of the taper of the said closure plug, a combined plug stop and adjustment collar mounted around said shank and having oppositely disposed halves cooperating with said shank taper through means for drawing together said opposite halves of said collar thereby producing a force on said shank taper to draw said plug to said casing seat, a stop plug connected to said casing whereby rotation of said collar is limited, a bearing washer mounted immediately below the said collar, a spring ring supporting the said bearing washer and means of allowing for deflection of the said spring, said means including an annular casing shoulder surrounding a shallow casing recess, and means for packing said valve to seal between the said collar and said plug.

2. The combination of a rotary plug valve body with a tapered valve seat and having transverse openings, a tapered closure plug mounted within said body and provided with a port to register with said body openings, a plug shank connected to the narrow end of said plug and provided with a tapered portion, the latter portion taper extending at an angle opposed to that of the taper of the said closure plug, a stop and adjustment collar with halves mounted around and formed to cooperate with said plug shank taper and provided with means for limiting plug shank rotation and means for applying force on said plug shank taper, said limiting rotation means including two diametrically opposite overhanging collar ends which meet with two diametrically opposite projections on said body upon rotation of said plug shank, said applying force means including substantially diametrically opposite connecting bolts arranged to draw said halves of said collar together and against said plug shank taper, and a resilient support on said body for said collar.

3. A valve of the character described, comprising a valve body having a tapered valve seat and transverse openings therethrough, a tapered plug rotatably mounted to interrupt fluid flow through said valve openings and having a port to communicate with said valve openings, a plug shank extending from the narrow end of said tapered plug and projecting through a packed chamber in the said valve body, shank tapers inverted to said plug taper and along a portion of and on opposite sides of said shank, a combination stop and adjustment collar with opposite halves and mounted around and having tapers in cooperation with said shank tapers, means for drawing together opposite halves of said collar forcing said collar tapers against said shank tapers and moving said collar downward, a spring ring interposed between said collar and said valve body thereby giving a resilient support to said collar to provide for drawing up on said plug shank, means for providing for a predetermined limited deflection of said spring ring, cooperating means on said collar and said body for limiting rotation of said collar.

4. A valve comprising a valve body having a tapered valve seat and transverse openings therethrough, a frusto-conical rotatable plug disposed within said valve seat having a port to register with said openings, a valve body packing chamber exteriorly of said valve seat, a plug shank extending from the narrow end of said plug and through the said packing chamber, said plug shank having diametrically oppositely disposed tapers along a portion outward from said packing chamber, the tapers of the shank extending at an angle opposed to that of the taper of the frusto-conical plug, a combination stop and adjustment collar mounted around the said shank tapers, said collar having diametrically oppositely disposed threaded means cooperating with said shank tapers in a manner to apply a force against the tapers of said shank to draw said plug axially toward said valve seat, means on said collar and said body for predeterminately stopping rotation of said plug in both directions, an annular shoulder forming an annular recess of predetermined depth and integral with said body, a spring ring supported by said annular shoulder and said spring ring supporting the said collar.

References Cited in the file of this patent

UNITED STATES PATENTS

| Number | Name | Date |
|---|---|---|
| 491,469 | Carver | Feb. 7, 1893 |
| 1,826,330 | Thiele | Oct. 6, 1931 |
| 2,296,650 | Mueller | Sept. 22, 1942 |
| 2,309,304 | Creighton | Jan. 26, 1943 |
| 2,594,141 | Feighner | Apr. 22, 1952 |

FOREIGN PATENTS

| Number | Country | Date |
|---|---|---|
| 194,642 | Germany | Jan. 28, 1908 |
| 561,065 | France | Oct. 16, 1923 |